United States Patent Office 2,735,978
Patented Feb. 21, 1956

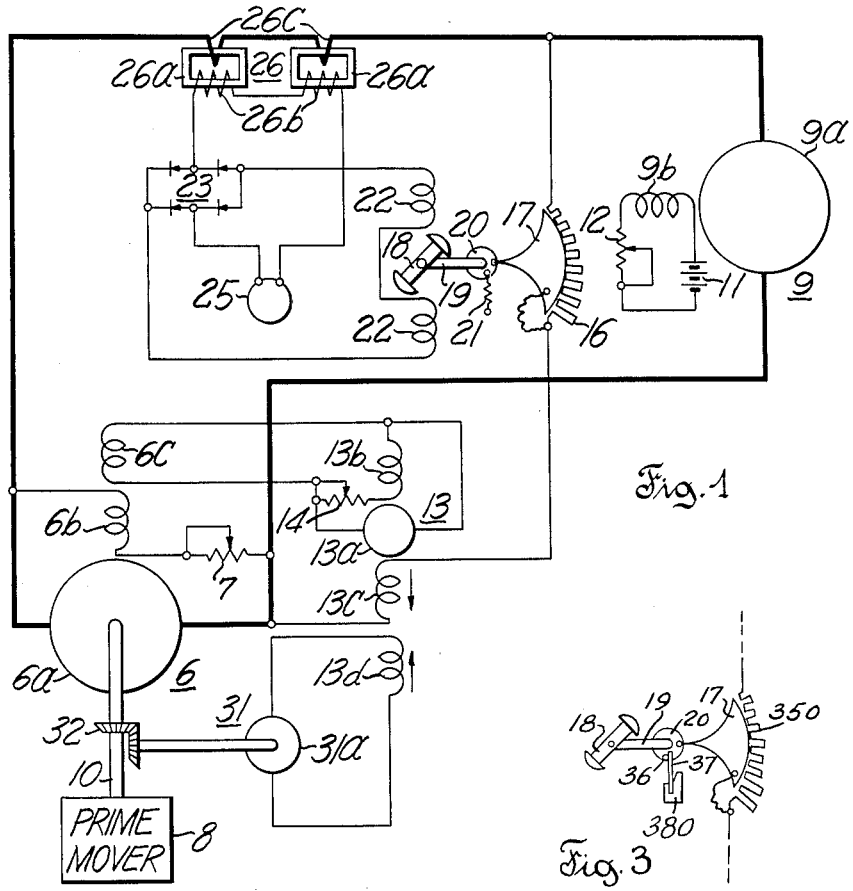
Fig. 1
Fig. 3
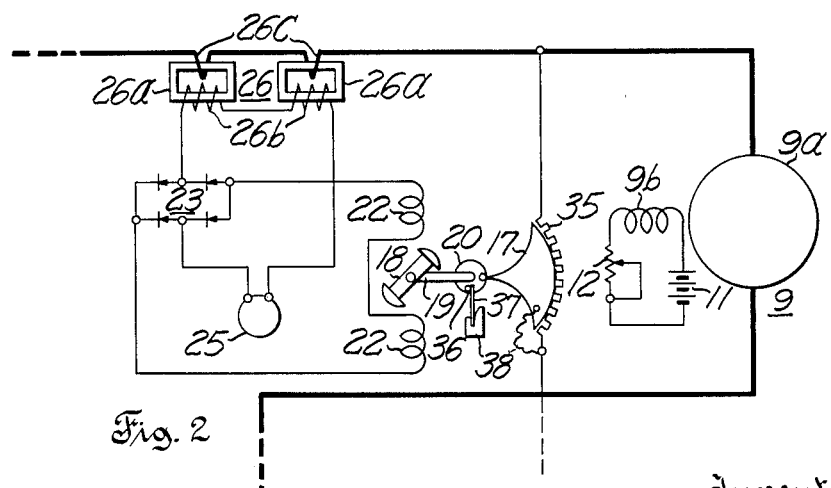
Fig. 2

2,735,978
ELECTRIC POWER OUTPUT RESPONSIVE SYSTEM

Richard W. Jones, Evanston, Ill., assignor to Allis-Chalmers Manufacturing Company, Milwaukee, Wis.

Application April 30, 1952, Serial No. 285,229

9 Claims. (Cl. 322—25)

This invention relates in general to electric regulating devices and in particular to regulating devices of the power measuring or limiting type.

It is often desirable to provide some means responsive to the power supplied from a source of electrical energy to a load for limiting the maximum power which may be thus supplied. A conventional two coil watt meter may be used in such circumstances to move the adjustable tap of a slide wire resistor or other similar device to provide an electrical indication of the power. However, such meters are expensive and do not produce sufficient torque to provide an electrical signal which can be utilized without considerable amplification.

These disadvantages may be overcome by utilizing a regulating device comprising resistance means whose resistance varies as a function of one of the power determining electric quantities of the circuit and which is energized in dependence upon the magnitude of the other power determining quantity so that the current flow through the resistance means is a function of the circuit power. One of the most suitable of such devices is a resistor which has impressed thereon the circuit voltage and whose resistance varies hyperbolically with respect to the circuit current to provide a control signal which is substantially directly proportional to the circuit power.

It is therefore an object of this invention to provide an improved device for measuring or controlling the power of an electric circuit.

It is an additional object of the present invention to provide an improved electric regulating system for controlling the power supplied from an electrical source to a load device.

It is a further object of this invention to provide an electric power regulating device having its movable element actuated responsive to only one electric quantity.

It is an additional object of the present invention to provide an electric power regulating device in which a voltage which is a measure of one of the power determining quantities of the circuit is modulated in accordance with variations of the other power determining quantity to produce a control signal dependent upon the circuit power.

Objects and advantages other than those set forth above will be apparent from the following description when read in connection with the accompanying drawing, in which:

Fig. 1 diagrammatically illustrates the circuits and apparatus of the preferred embodiment of the invention utilizing resistance means whose resistance varies inversely with respect to one of the power determining electric quantities of the circuit;

Fig. 2 partially illustrates the circuits and apparatus of an alternate embodiment of the invention;

Fig. 3 partially illustrates another alternate embodiment of the invention.

Referring to the drawing by character of reference, Fig. 1 illustrates the one embodiment of the invention utilized in connection with the control of electric power supplied from a source, such as a unidirectional current generator 6, to a suitable load. Generator 6 is provided with an armature 6a, a self-excited field winding 6b connected across armature 6a through an adjustable resistor 7, and a control field winding 6c. Generator 6 may be driven by any suitable known prime mover such as a diesel engine 8 through a shaft 10. Generator 6 supplies current to the armature 9a of a motor 9 having a field winding 9b energized from a battery 11 through an adjustable resistor 12. Motor 9 may drive any suitable load such as one axle of a diesel electric locomotive.

Field winding 6c is supplied with current from any suitable controllable source of direct current such as the armature 13a of an exciter generator 13 having a pair of differentially acting control field windings 13c, 13d and a self-excited field winding 13b connected across armature 13a in series with an adjustable resistor 14. Field winding 13c is supplied with current which is a measure of the power supplied from generator 6 to motor 9. Such current may be supplied through resistance means in the form of a resistor 16 connected in series with field winding 13c to be energized in dependence upon the magnitude of one of the power determining quantities of the circuit including motor 9. Resistor 16 and field winding 13c may be connected to have impressed thereon a voltage which is a measure of the load circuit current or may, as shown, be connected across armature 9a to be impressed with the voltage thereof. The resistance of resistor 16 varies in a predetermined manner in accordance with the function of the circuit power which it is desired to measure and control. If a directly proportional measure of power is desired the resistance of resistor 16 varies hyperbolically per unit length of the resistor.

Resistor 16 is provided with a variable contact in the form of an arcuate conductive sector 17 adapted to move on resistor 16 to vary the resistance thereof. Suitable actuating means are provided for moving sector 17 including the rotor 18 and shaft 19 of a motor acting on sector 17 through a disk 20 against the action of a spring 21. The position of rotor 18 is determined by the energization of a field winding 22. Field winding 22 is connected through the direct current terminals of a suitable full wave rectifier 23 to a source of alternating current represented by generator 25. Connected in series with generator 25 and the alternating current terminals of rectifier 23 is the reactance winding 26b of a saturable reactor 26 having a pair of saturable cores 26a and a control winding 26c. Control winding 26c is connected in series with armatures 6a, 9a to vary the reactance of winding 26b in response to variations in the current supplied to armature 9a, thus varying the voltage impressed on field winding 22 in response to variations in the current supplied to armature 9a.

Field winding 13d is connected to the armature 31a of a tachometer generator 31 driven at a speed proportional to the speed of engine 8 through gearing 32.

Since the power available from engine 8 is limited at each speed thereof, it is necessary to limit the power supplied from generator 6 to motor 9 at the different engine speeds to prevent overloading and consequent stalling of engine 8. When engine 8 is started and brought up to a speed corresponding to, say, the first throttle notch of the locomotive controller, tachometer generator 31 impresses a voltage on field winding 13d which is a measure of the maximum power available from engine 8 at this speed. This voltage tends to increase the armature voltage of exciter 13 to thereby increase the armature voltage of generator 6. Generator 6 thereupon supplies power to motor 9 to start the locomotive or other load device being driven by motor 9. The current supplied to motor armature 9a traverses control winding 26c to cause source 25 to impress on field winding 22 a voltage dependent upon such current. Rotor 18 takes up a position determined by the strength of the field of field winding 22 to position shaft 19 and sector 17 in dependence upon the strength of the field. Sector 17 short circuits a predetermined portion of hyperbolically stepped resistor 16 to impress a predetermined voltage on control field winding 13c. The current $I_f$ flowing in field winding 13c as a result of latter voltage is substantially proportional to the power supplied to motor 9 as will be seen from the following equations.

(1) $$I_f = \frac{V_m}{R_h + R_f}$$

where $V_m$ is the voltage of motor armature 9a, $R_h$ is the resistance of hyperbolically stepped resistor 16, and $R_f$ is the resistance of field winding 13c. Assuming that the movement of sector 17 along hyperbolically stepped resistor 16 is uniform per unit variation of the current $I_m$ in control winding 26c, $R_h$ may be stated as a hyperbolic function of current $I_m$ as (2) $$R_h = \frac{K}{I_m}$$

where K is a constant.

Substituting Equation 2 in Equation 1 produces (3) $$I_f = \frac{V_m}{\frac{K}{I_m} + R_f}$$

Assuming that the resistance $R_f$ of field winding 13c is negligible compared to the resistance $R_h$ of resistor 16, which assumption is justified since field winding 13c is designed to have a very low resistance, Equation 3 simplifies to (4) $$I_f = K_1(I_m V_m)$$

Where $K_1$ is the reciprocal of K. Thus, a voltage which is a measure of the voltage of armature 9a is modulated by the circuit current so that the current $I_f$ in field winding 13c is substantially proportional to the power $(I_m V_m)$ supplied to motor 9.

The energization of field winding 13c therefore increases substantially proportionally to the power supplied to motor 9. When the magnetomotive force of field winding 13c is equal to the magnetomotive force of differentially acting field winding 13d, indicating that motor 9 is absorbing the maximum available power from engine 8 for that particular throttle setting, the net magnetomotive force of windings 13c, 13d is zero. Assuming that resistor 14 is adjusted so that field winding 13b supplies all of the excitation required to maintain the voltage of armature 13a at any given value, exciter 13 maintains the energization of field winding 6c at the value required to produce in armature 6a the voltage which will cause motor 9 to absorb only the maximum available power from engine 8. If the power absorbed by motor 9 tends to increase above the maximum value, sector 17 is actuated as described above to increase the current supplied to field winding 13c substantially proportionally to the increased power. This action causes the magnetomotive force of field winding 13c to exceed the magnetomotive force of field winding 13d to thereby decrease the voltage of armature 6a until the power supplied to motor 9 returns to the desired value.

As the speed of engine 8 is increased through the successive throttle notches, making successively more power available from engine 8, the speed and voltage of the tachometer generator increase to successively increase the energization of field winding 13d. Thus, the maximum power of motor 9 at which the magnetomotive force of field winding 13c equals the magnetomotive force of field winding 13d is successively increased to permit motor 9 to absorb increased power with increased engine speed.

Fig. 2 partially illustrates an alternate embodiment of the invention in which the resistance of suitable resistance means 35 is varied by sector 17 through rotor 18 and shaft 19 acting against a leaf spring 37. Spring 37 has one end bearing against a pin 36 on disk 20 and has its other end engaging suitable cam means 38. Cam means 38 is so shaped that as disk 20 rotates, a varying portion of the surface of spring 37 engages the cam means, thereby varying the effective length of spring 37 so as to vary the stiffness thereof. Fig. 3 partially illustrates another alternate embodiment wherein the shape of the cam means 38a may be selected so that the stiffness of spring 37 varies nonlinearly per unit rotation of disk 20 and this nonlinear variation, together with a nonuniform distribution of the resistance of resistor 35a, produces a hyperbolic variation of the resistance of resistor 35a with variations in the current supplied to motor 9.

However, as is shown in Fig. 2, the shape of cam means 38 is preferably selected so that the stiffness of spring 37 varies hyperbolically per unit rotation of disk 20, and the resistance of resistor 35 is uniformly distributed per unit length. Assuming that the torque acting on rotor 18 varies uniformly per unit variation of the current in control winding 26c, it will be seen that, owing to the action of spring 37, the movement of sector 17 on resistor 35 will vary hyperbolically with respect to the circuit current to thereby cause the current through resistor 35 to vary substantially inversely with respect to the load circuit current. Thus, the embodiment illustrated in Fig. 2 operates similarly to the embodiment of Fig. 1 to energize field winding 13c in dependence upon the power supplied to motor 9.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. An electrical regulating device for a unidirectional current circuit comprising resistance means connected to said circuit to impress on a portion of said resistance means the voltage of said circuit, the resistance of said resistance means being uniformly distributed per unit length, control means for said circuit connected in series with said portion of said resistance means, an arcuate conductive sector adapted to move on said resistance means to vary the length of said portion thereof, electric actuating means for urging movement of said sector in one direction linearly per unit variation of said current, spring means for urging movement of said sector in the opposite direction, said spring means and said actuating means being arranged to jointly move said sector hyperbolically per unit variation of said current, a source of alternating current, a saturable reactor having a control winding and a reactance winding, means connecting said control winding to said circuit to respond to the current therein, means connecting said actuating means to said source through said reactive winding for impressing on said actuating means a voltage dependent upon said current to move said arcuate conductive sector for causing the resistance of said portion of said resistance means to vary according to a hyperbolic function of said current to thereby energize said control means substantially in direct proportion to the power of said circuit.

2. An electrical regulating device for a unidirectional current circuit comprising resistance means connected to said circuit to impress the voltage of said circuit on a portion of said resistance means, the resistance of said resistance means being hyperbolically distributed per unit length, control means for said circuit connected in series with said portion of said resistance means, a variable contact for varying the length of said portion of said resistance means, actuating means for moving said variable contact, a source of alternating current, a saturable reactor having a control winding and a reactance winding, means connecting said control winding to said circuit to respond to the current therein, and means connecting said actuating means to said source through said reactance winding for causing said actuating means to move said variable contact linearly per unit variation of said circuit current to cause the resistance of said portion of said resistance means to vary according to a hyperbolic function of said current to energize said control means substantially in direct proportion to the power of said circuit.

3. An electrical regulating device for a unidirectional current circuit comprising resistance means connected to said circuit to impress the voltage of said circuit on a portion of said resistance means, the resistance of said resistance means being uniformly distributed per unit length, control means for said circuit connected in series with said portion of said resistance means, a variable contact for varying the length of said portion of said resistance means, actuating means for moving said variable contact, a source of alternating current, a saturable reactor having a control winding and a reactance winding, means connecting said control winding to said circuit to respond to the current therein, and means connecting said actuating means to said source through said reactance winding for moving said variable contact hyperbolically per unit variation of said current to cause the resistance of said portion of said resistance means to vary according to a hyperbolic function of said current to thereby energize said control means substantially in direct proportion to the power of said circuit.

4. An electrical regulating device for a unidirectional current circuit comprising resistance means connected to said circuit to impress the voltage of said circuit on a portion of said resistance means, the resistance of said means varying hyperbolically per unit length, control means for said circuit connected in series with said portion of said resistance means, a variable contact for varying the length of said portion of said resistance means, actuating means for moving said variable contact, a source of alternating current, a saturable reactor having a control winding and a reactance winding, means connecting said control winding to said circuit to respond to the current of said circuit, and means connecting said actuating means to said source through said reactance winding for impressing on said actuating means a voltage dependent upon the current in said circuit causing said actuating means to move said variable contact linearly of said current to cause the resistance of said portion of said resistance means to vary according to a hyperbolic function of said current to thereby energize said control means substantially in direct proportion to the power of said circuit.

5. An electrical regulating device for a unidirectional current circuit comprising resistance means connected to said circuit for impressing the voltage of said circuit on said resistance means, control means for said circuit connected in series with said resistance means, a source of alternating current, a saturable reactor having a control winding and a reactance winding, means connecting said control winding to said circuit to respond to the current therein, and actuating means connected to said source through said reactance winding for causing the resistance of said resistance means to vary according to a hyperbolic function of said current to thereby energize said control means substantially in direct proportion to the power of said circuit.

6. An electrical regulating device for a unidirectional current circuit comprising resistance means connected to said circuit for impressing the voltage of said circuit on a portion of said resistance means, the resistance of said resistance means being nonuniformly distributed per unit length, control means for said circuit connected in series with said portion of said resistance means, a variable contact for varying the length of said portion of said resistance means, and actuating means responsive to the current of said circuit for moving said variable contact nonlinearly on said resistance means per unit variation of said current to cause the resistance of said portion of said resistance means to vary according to a hyperbolic function of said current to thereby energize said control means substantially in direct proportion to the power of said circuit.

7. An electrical regulating device for a unidirectional current circuit comprising resistance means connected to said circuit to impress the voltage of said circuit on a portion of said resistance means, the resistance of said resistance means being uniformly distributed per unit length, control means for said circuit connected in series with said portion of said resistance means, a variable contact for varying the length of said portion of said resistance means, and actuating means responsive to the current of said circuit for moving said variable contact hyperbolically per unit variation of said current to cause the resistance of said portion of said resistance means to vary according to a hyperbolic function of said current to thereby energize said control means substantially in direct proportion to the power of said circuit.

8. An electrical regulating device for a unidirectional current circuit comprising resistance means connected to said circuit to impress the voltage of said circuit on a portion of said resistance means, the resistance of said resistance means varying hyperbolically per unit length, control means for said circuit connected in series with said portion of said resistance means, a variable contact for varying the length of said portion of said resistance means, and actuating means responsive to the current of said circuit for moving said variable contact linearly per unit variation of said current to cause the resistance of said portion of said resistance means to vary according to a hyperbolic function of said current to thereby energize said control means substantially in direct proportion to the power of said circuit.

9. An electrical regulating device for a unidirectional current circuit comprising resistance means connected to said circuit for impressing the voltage of said circuit on said resistance means, control means for said circuit connected in series with said resistance means, and means responsive to the current of said circuit for causing the resistance of said resistance means to vary according to a hyperbolic function of said current to energize said control means substantially in direct proportion to the power of said circuit.

References Cited in the file of this patent

UNITED STATES PATENTS

| | | |
|---|---|---|
| 1,914,545 | Von Ohlsen et al. | June 20, 1933 |
| 2,000,675 | Terry | May 7, 1935 |
| 2,179,623 | Godsey | Nov. 14, 1939 |
| 2,594,730 | Cassidy | Apr. 29, 1952 |

FOREIGN PATENTS

| | | |
|---|---|---|
| 742,841 | France | Jan. 4, 1933 |
| 906,811 | France | May 28, 1945 |
| 945,861 | France | Dec. 6, 1948 |
| 685,796 | Germany | Dec. 27, 1939 |
| 290,428 | Italy | Nov. 18, 1931 |